UNITED STATES PATENT OFFICE.

JULIUS BERTRAM, OF LEIPSIC, GERMANY.

PROCESS OF MAKING VANILLIN.

SPECIFICATION forming part of Letters Patent No. 519,693, dated May 15, 1894.

Application filed December 24, 1890. Serial No. 375,717. (No specimens.)

*To all whom it may concern:*

Be it known that I, JULIUS BERTRAM, of Leipsic, in the Kingdom of Saxony, Germany, have invented a new and useful Process or Processes of Obtaining the two Isomeric Monomethyl-Ethers of Protocatechuic Aldehyde, of which the following is a specification.

Starting with the supposition that the two hydroxyls of the proto-catechuic aldehyde possess different degrees of affinity, I have discovered the following methods of obtaining the two isomeric methyl-ethers of the same:

If molecular quantities of the halogen-compounds of methyl or of methyl-sulfates of alkalies or alkaline earths are caused to act on the dimetallic sodium salts of proto-catechuic aldehyde, there arises a metallic compound of vanillin (meta-methyl-ether of proto-catechuic aldehyde.)

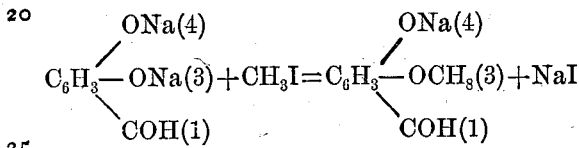

If, however, the same methyl-compounds are caused to act on the monometallic salts of proto-catechuic aldehyde, we obtain the para-methyl-ether, that is iso-vanillin.

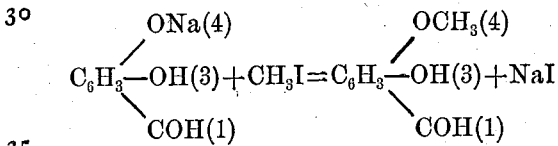

*Example for vanillin.*—4.2 kilos of proto-catechuic aldehyde and 3.4 kilos of potassium hydrate are dissolved in twenty kilos of alcohol, 4.3 kilos of methyl-iodide are added to the solution, and this mixture is heated in a hermetically closed vessel to 100° Celsius for about two hours. The alcohol is distilled off, dilute sulfuric acid is added until neutralization, and the aldehydes are separated from the liquid by shaking it with ether. After the evaporation of the ether, there remains a mixture of vanillin and proto-catechuic aldehyde, which are separated by boiling with chloroform, the latter dissolving the vanillin only. The vanillin is purified by distillation in vacuo (boiling point, at fifteen millimeters pressure, 170° centigrade, melting point 81.5° centigrade.)

*Example for iso-vanillin.*—For 4.2 kilos of proto-catechuic aldehyde take only 1.7 kilos of potassium hydrate, dissolve in 15 kilos of alcohol, add 4.3 kilos of methyl-iodide and proceed in other respects exactly as described above for the manufacture of vanillin. The boiling temperature of iso-vanillin at fifteen millimeters pressure is 179° centigrade, its melting point at 115° to 116°.

Having now particularly described and ascertained the nature of my said invention and in what manner the same is to be performed, I declare that what I claim is—

The process of making vanillin and its isomers, which consists in treating the metallic compounds of protocatechuic aldehyde, such as sodium protocatechuic aldehyde, with haloid compounds of methyl or methyl-sulfates.

In testimony whereof I have signed my name to this specification in the presence of two subscribing witnesses.

JULIUS BERTRAM.

Witnesses:
 MAX MATTHÄI,
 CARL BORNGRAEBER.